United States Patent
Hamann et al.

(10) Patent No.: US 10,326,344 B2
(45) Date of Patent: Jun. 18, 2019

(54) POLYPHASE TRANSVERSE FLUX MACHINE

(71) Applicant: SIEMENS AKTIENGESELLSCHAFT, München (DE)

(72) Inventors: Jens Hamann, Fürth (DE); Dietmar Stoiber, Fürth (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/577,491

(22) PCT Filed: Apr. 14, 2016

(86) PCT No.: PCT/EP2016/058215
§ 371 (c)(1),
(2) Date: Nov. 28, 2017

(87) PCT Pub. No.: WO2016/192881
PCT Pub. Date: Dec. 8, 2016

(65) Prior Publication Data
US 2018/0331607 A1    Nov. 15, 2018

(30) Foreign Application Priority Data

Jun. 1, 2015  (DE) .................... 10 2015 210 032

(51) Int. Cl.
*H02K 21/12* (2006.01)
*H02K 21/38* (2006.01)
(Continued)

(52) U.S. Cl.
CPC ........... *H02K 21/38* (2013.01); *H02K 1/2753* (2013.01); *H02K 1/2786* (2013.01); *H02K 16/04* (2013.01); *H02K 21/125* (2013.01)

(58) Field of Classification Search
CPC ...... H02K 21/125; H02K 21/38; H02K 16/04; H02K 1/2753; H02K 1/2786
(Continued)

(56) References Cited

U.S. PATENT DOCUMENTS 5,289,072 A      2/1994  Lange
8,461,732 B2 *   6/2013  Gieras .................. H02K 21/046
                                                        310/216.023
(Continued)

FOREIGN PATENT DOCUMENTS

CN        101087114 A    12/2007
CN        102522834 B    12/2013
(Continued)

OTHER PUBLICATIONS

German Search Report for German Application No. 102015210032.4, dated Feb. 5, 2016.
(Continued)

*Primary Examiner* — Thanh Lam
(74) *Attorney, Agent, or Firm* — Lempia Summerfield Katz LLC

(57) ABSTRACT

The disclosure relates to a polyphase transverse flux machine including a stator and a rotor configured to rotate relative to the stator about an axis in a circumferential direction. The transverse flux machine includes an electrical line running along a plurality of yokes in the circumferential direction, and a pair of permanent magnet arrays running in parallel in the circumferential direction. A plurality of return path bodies is provided in the stator, wherein each yoke has an associated return path body at a distance from the associated yoke in the radial direction. The magnetization direction of the permanent magnets in the permanent magnet arrays changes in such a way that a closed magnetic flux repeatedly occurs at each yoke during rotation of the rotor.

(Continued)

The closed magnetic flux runs from one permanent magnet array across a respective yoke to the other permanent magnet array, and from there, across the associated return path body, back to the first-mentioned permanent magnet array.

19 Claims, 2 Drawing Sheets

(51) Int. Cl.
  *H02K 1/27* (2006.01)
  *H02K 16/04* (2006.01)
(58) Field of Classification Search
  USPC ............................................. 310/156.43, 15
  See application file for complete search history.

(56) References Cited

U.S. PATENT DOCUMENTS

| | | | |
|---|---|---|---|
| 2002/0171315 A1* | 11/2002 | Kastinger | ............... H02K 21/14 310/49.08 |
| 2002/0180294 A1 | 12/2002 | Kaneda et al. | |
| 2005/0062352 A1* | 3/2005 | Kastinger | ............. E21B 17/028 310/156.02 |
| 2005/0225192 A1 | 10/2005 | Kloepzig et al. | |
| 2007/0222304 A1* | 9/2007 | Jajtic | ........................ H02K 1/06 310/12.18 |
| 2008/0218021 A1* | 9/2008 | Lange | .................. H02K 21/125 310/156.02 |
| 2009/0206686 A1 | 8/2009 | Vollmer | |
| 2011/0012463 A1 | 1/2011 | Duncan et al. | |

FOREIGN PATENT DOCUMENTS

| | | |
|---|---|---|
| DE | 3730615 A1 | 3/1989 |
| DE | 102004017507 A1 | 10/2005 |
| DE | 102006027819 A1 | 12/2007 |
| DE | 112008002073 T5 | 8/2010 |
| EP | 2493054 A1 | 8/2012 |
| EP | 2605367 A1 | 6/2013 |
| WO | 9210023 A1 | 6/1992 |
| WO | 2007090776 A1 | 8/2007 |
| WO | 2013087412 A1 | 6/2013 |

OTHER PUBLICATIONS

PCT International Search Report for corresponding PCT/EP2016/058215, dated Jun. 21, 2016.
Chinese Office Action for Chinese Application No. 201680032094.8 dated Jan. 23, 2019.

* cited by examiner

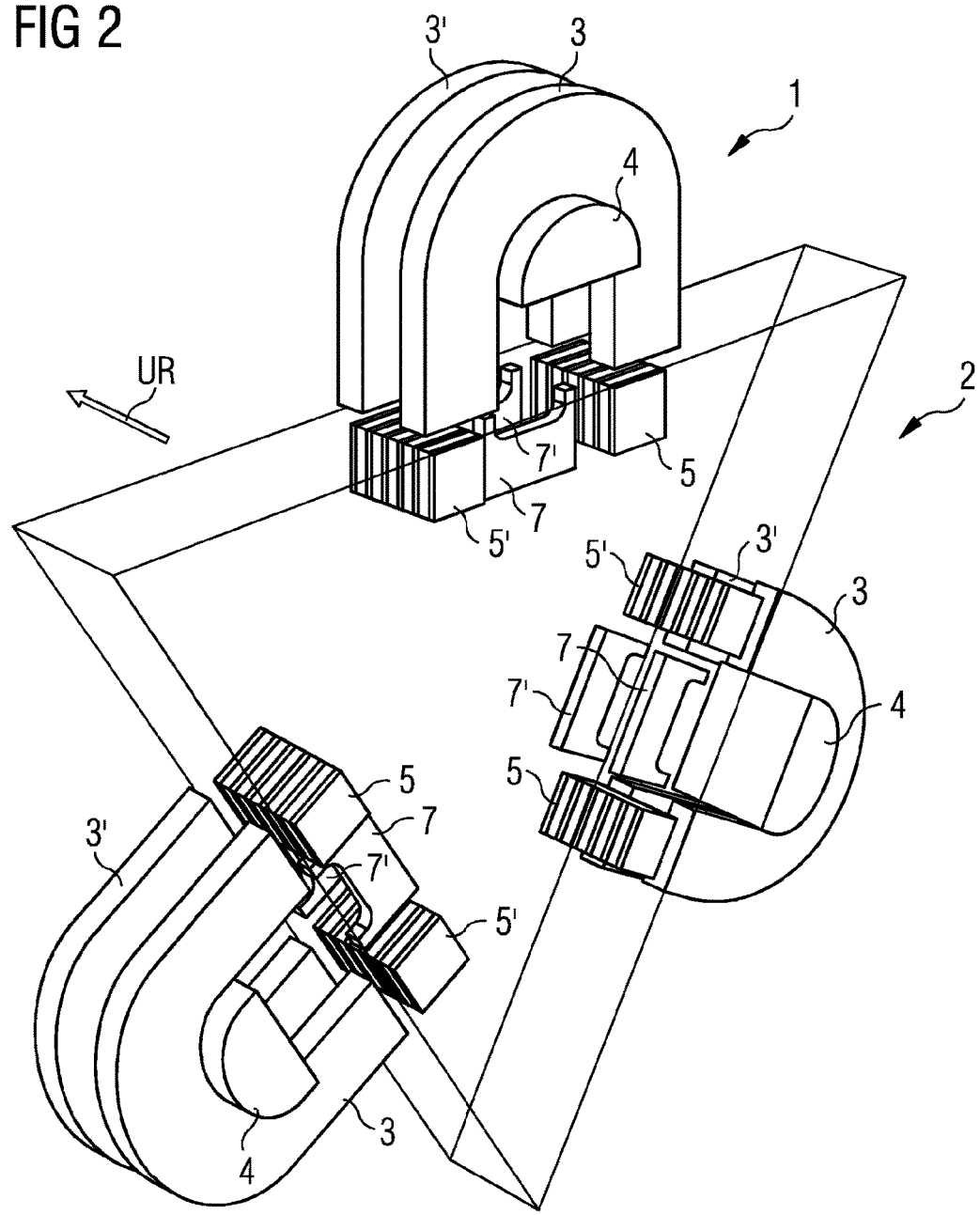

POLYPHASE TRANSVERSE FLUX MACHINE

The present patent document is a § 371 nationalization of PCT Application Serial Number PCT/EP2016/058215, filed Apr. 14, 2016, designating the United States, which is hereby incorporated by reference, and this patent document also claims the benefit of DE 10 2015 210 032.4, filed Jun. 1, 2015, which is also hereby incorporated by reference.

TECHNICAL FIELD

The disclosure relates to a polyphase transverse flux machine having a stator and a rotor that may be rotated relative to the stator about an axis in a circumferential direction. The transverse flux machine may be embodied as a motor (e.g., torque motor or linear motor) or as a corresponding generator.

BACKGROUND

Contemporary torque motors may have a power density of 1 kW/kg. However, in all the technical fields in which such motors are used, efforts are also being made, inter alia, to improve this power density. This would be advantageous, in particular, in the automobile industry or aircraft industry. Specifically, in the aircraft industry, drive systems with a power density of 8 kW/kg are required.

Electric drive systems are currently generally used only for model aircraft. For example, a high-pole-number motor as an aircraft electric motor without a transmission is known from Geiger Engineering. The electric motor has a magnetic pole number of 42 and a power of 20 kW with a limiting rotational speed of 2500 revolutions per minute. For the starting phase, this motor has a power-to-weight ratio of 3.6 kW/kg.

In transverse flux machines, the magnetic flux runs transversely (e.g., perpendicularly) with respect to the rotational plane. In three-phase transverse flux machines, each phase may have its own excitation. However, transverse flux machines in which the three phases are fed by just one permanent magnet system are also known. Transverse flux machines are able to implement high pole pair numbers and therefore have small pole pitches. The iron weight per pole is therefore small, and consequently a favorable power-to-weight ratio is obtained. The winding heads are eliminated owing to the ring winding.

Document WO 2013/087412 A1 discloses a polyphase transverse flux machine in which Halbach arrays are arranged on the rotor. In order to form a closed magnetic flux, in addition, I cores are provided adjacent to corresponding yokes in the stator. As a result of the spatial proximity of the yokes to the I cores, the problem arises that an undesired transverse flux occurs which brings about magnetic saturation between the yokes and the I cores. This results in the torque yield remaining the same at high currents.

SUMMARY AND DESCRIPTION

The object of the disclosure is therefore to provide a polyphase transverse flux machine with an improved torque yield.

The scope of the present disclosure is defined solely by the appended claims and is not affected to any degree by the statements within this summary. The present embodiments may obviate one or more of the drawbacks or limitations in the related art.

The transverse flux machine includes a stator and a rotor, wherein the rotor may be rotated relative to the stator about an axis in a circumferential direction. The rotor and the stator may be embodied in an annular shape, with the result that the circumferential direction corresponds to an orbit. The transverse flux machines include, for a respective current phase, the components explained below.

An electrical line (e.g., a ring line) is provided that runs along a multiplicity of yokes in the circumferential direction, wherein the line and the multiplicity of yokes are arranged in the stator. The term 'line' is to be understood broadly. In particular, a line may be composed of an individual conductor or of a plurality of individual conductors.

A pair of permanent magnet arrays run in parallel in the circumferential direction and each include a multiplicity of permanent magnets. The permanent magnet arrays are embodied in the rotor. In addition, a multiplicity of return path bodies is provided in the stator, wherein each yoke is assigned a return path body spaced apart from the associated yoke (e.g., the yoke to which the return path body is assigned) in the radial direction (e.g., in the direction perpendicular with respect to the axis of the transverse flux machine). This means that when viewed in the direction of the circumferential direction, there is no overlap between the cross section of the return path body and the cross section of the associated yoke.

In the transverse flux machine, the magnetization direction of the permanent magnets in the permanent magnet arrays changes in such a way that a closed magnetic flux repeatedly occurs at each yoke during the rotation of the rotor, wherein the closed magnetic flux runs from one permanent magnet array of the pair via a respective yoke to the other permanent magnet array of the pair, and from there via the return path body assigned to the respective yoke back to the first-mentioned permanent magnet array of the pair.

The transverse flux machine is defined by the fact that transverse fluxes are avoided by the spacing apart of the return path body from the yoke, and this therefore counteracts magnetic saturation. At the same time, a return path of the magnetic flux via the return path bodies is brought about by suitably changing the magnetization direction in the permanent magnet arrays.

In one particular embodiment, a first gap is provided between each permanent magnet array and each yoke. The gap may also be referred to as an air gap. Moreover, a second gap is formed between each return path body and each permanent magnet array. This second gap lies in a different plane than the first gap. The closed magnetic flux escapes at the first gap and at the second gap here. The term "different plane" is to be understood broadly. In particular, the two planes of the first and second gaps do not necessarily have to be forcibly rotated with respect to one another, but instead may also be merely offset with respect to one another. However, the plane of the second gap may be rotated through 90° with respect to the plane of the first gap.

In one particular embodiment, the respective return path bodies are arranged between the permanent magnet arrays of the pair. As a result, a compact design of the transverse flux machine is obtained.

In a further refinement, the respective return path bodies are arranged on inner sides of the permanent magnet arrays, wherein the inner sides face the axis of the transverse flux machine, and the yokes are positioned on opposite outer sides of the permanent magnet arrays. As a result, a particularly large distance is obtained between the return path bodies and the yokes.

In a further embodiment, a respective return path body is offset with respect to the associated yoke in the circumferential direction. This also brings about an increase in the distance between the yoke and the return path body and therefore a reduced transverse flux.

In a further embodiment, the permanent magnets of the respective permanent magnet arrays are arranged directly adjacent to one another in the circumferential direction. A flux collector may therefore be dispensed with.

In a further embodiment, the respective permanent magnet arrays are divided into repeating sections along the circumferential direction, wherein the magnetization direction of the permanent magnets of the respective permanent magnet array changes in such a way that the direction of the closed magnetic flux reverses from a section to the next, and the closed magnetic flux in each section rotates from a direction perpendicular with respect to the first gap to a direction perpendicular with respect to the second gap or from a direction perpendicular with respect to the second gap to a direction perpendicular with respect to the first gap.

The transverse flux machine may be configured in a three-phase fashion. In addition, the rotor may have the cross section of a triangle, and a pair of permanent magnet arrays is provided on each triangular side for a current phase, and return path bodies are guided in recesses on each triangular side. Nevertheless, refinements of the rotor as a square or as a hexagon and the like are also possible.

In one particular embodiment, the yokes of the transverse flux machine are U-shaped, wherein a respective line is arranged between the limbs of the U-shaped yokes of a corresponding phase.

In a further refinement, a respective line of the transverse flux machine has a circular outer diameter. In addition, a respective line may be embodied as a hollow conductor in the interior of which a cooling fluid is guided or a heating pipe is provided. As a result, efficient cooling of the machine during operation therefore is achieved.

BRIEF DESCRIPTION OF THE DRAWINGS

Exemplary embodiments are described in detail below with reference to the appended figures, in which:

FIG. 2 depicts a perspective illustration which clarifies the overall design of an embodiment of the transverse flux machine.

DETAILED DESCRIPTION

Figure 1:
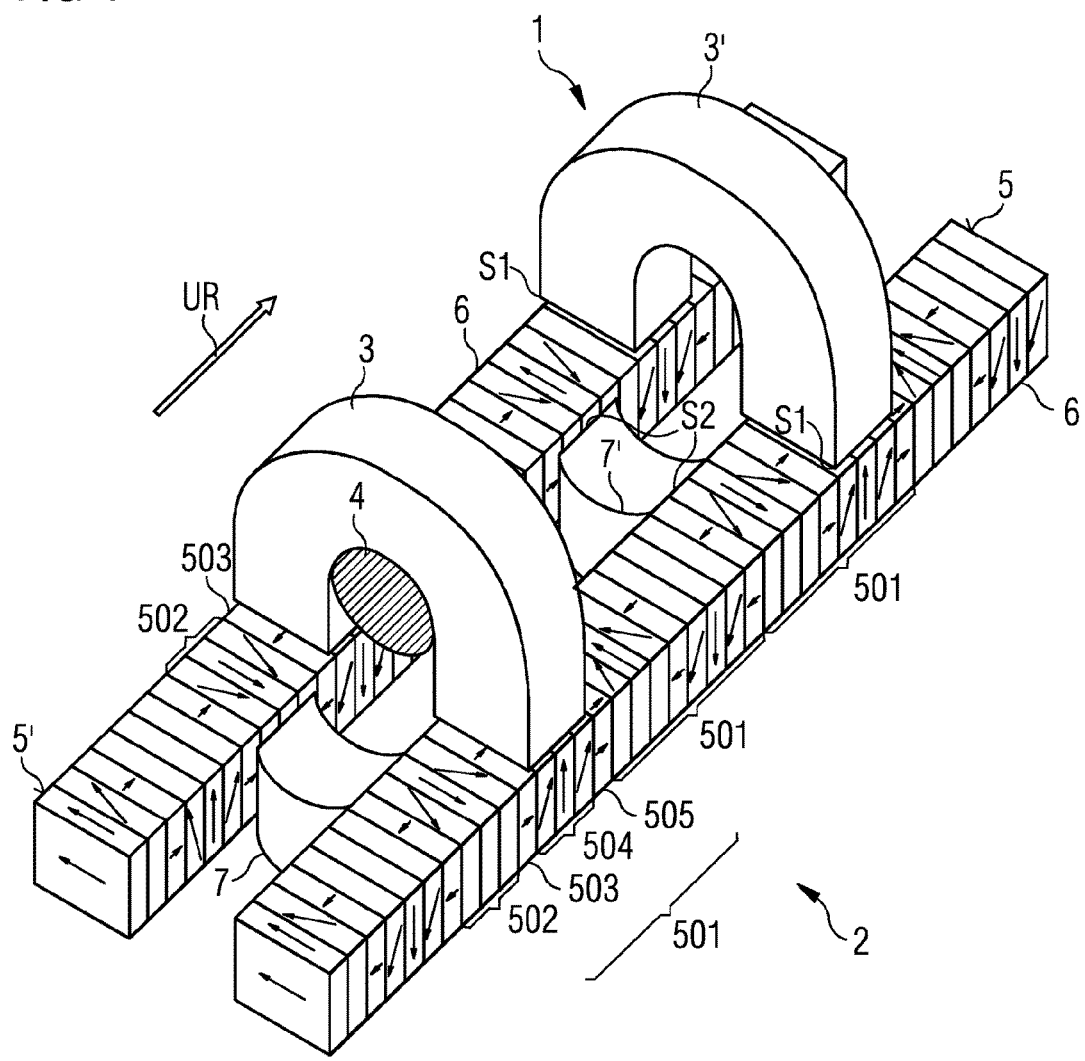
FIG. 1 depicts a perspective illustration of a detail of an embodiment of the transverse flux machine.

FIG. 1 depicts a perspective illustration of a detail of the design of a variant of the transverse flux machine, wherein the detail represents an individual phase. The transverse flux machine is a three-phase transverse flux machine whose overall design is depicted in FIG. 2, described below.

The transverse flux machine in FIG. 1 includes a stator 1, of which two yokes 3 and 3', two return path bodies 7 and 7', and a ring line 4 are represented partially. A rotor 2, of which only two permanent magnets arrays 5 and 5', integrated in the rotor, are illustrated, is provided adjacent to the stator. The rotor and the stator are configured in a circular shape and extend in the circumferential direction UR about an axis (not shown) of the transverse flux machine, about which the rotor rotates with respect to the stator.

A plurality of U-shaped yokes 3 and 3' that follow one another are provided in the stator along the circumferential direction UR, wherein the number of yokes is defined suitably in accordance with the pole number of the transverse flux machine. The yokes are composed in a manner known per se of soft irons and the ring line 4 is guided along the yokes between the limbs of their U shapes. The ring line 4 is indicated as a hatched circle on the yoke 3 for reasons of clarity. The transverse flux machine may be used here as a motor by conducting current through the ring line 4 in each individual phase of the machine. Likewise, the transverse flux machine may be used as a generator, in which case a three-phase current is generated in the lines 4 of the individual phases by rotating the rotor.

The individual return path bodies 7 and 7', which are part of the stator 1, are guided in a corresponding recess in the rotor between the two permanent magnet arrays 5 and 5'. The two permanent magnet arrays therefore rotate relative to the return path bodies 7 and 7'. The return path bodies are composed, like the yokes 3 and 3', of soft iron and serve to close the magnetic flux which is generated with the two permanent magnet arrays and runs via a respective yoke. Each return path body is assigned to a yoke. In other words, the return path body 7 is associated with the yoke 3, and the return path body 7' with the yoke 3'. The return path bodies in this case are offset with respect to the assigned yoke in the circumferential direction UR.

Conventionally, I-shaped return path bodies (e.g., I cores) are used to form a closed magnetic flux, the return path bodies not being arranged between the two permanent magnet arrays 5 and 5', but instead on the upper side of these arrays. In this context, magnetic flux in the permanent magnet arrays is reversed in order to be able to flow between the yoke and the I core. However, this arrangement has the disadvantage that the I-shaped return path bodies are positioned very close to the yokes, which leads to a situation in which an undesired magnetic transverse flux occurs between the I cores and the yokes, which magnetic transverse flux gives rise to saturation. Accordingly, at high currents the torque yield remains the same.

This disadvantage is overcome with the arrangement in FIG. 1. As is apparent, the return path bodies 7 and 7' are now arranged at a relatively large distance from the associated yokes 5 and 5'. In particular, the return path bodies are spaced apart from the yokes in the radial direction, e.g., in the direction perpendicular to the axis of the transverse flux machine. In other words, in the viewing direction of the circumferential direction UR there is no overlap of the cross section of the return path bodies with the corresponding yokes. In order, nevertheless, to generate a closed magnetic flux, a specific profile of the magnetization directions in the individual permanent magnet arrays 5 and 5' is defined, as is explained in more detail below.

The arrangement of the two permanent magnet arrays 5, 5' is such with respect to the yokes 3, 3' and the return path bodies 7, 7' that a first gap S1 is formed between the undersides of the yokes and the respective arrays lying underneath. This gap may also be referred to as an air gap. In addition, for each return path body, there are the two gaps S2 formed between a respective outer side of the return path body and a respective inner side of the permanent magnet arrays. For reasons of clarity, only some of the specified gaps are denoted by the reference symbol S1 and S2. The respective permanent magnet arrays 5 and 5' are composed of a plurality of rectangular permanent magnets arranged directly one behind the other, and which for reasons of clarity are denoted by the reference symbol 6 at only two points. The magnetization directions in the individual permanent magnets are indicated by corresponding arrows.

The permanent magnets of the individual arrays form repeating sections 501 that follow one another in the circumferential direction, wherein the profile of the magnetization directions reverses from one section to the next. Within one section 501, the magnetization directions of the individual permanent magnets 6 are selected in such a way that given the positioning of the yokes depicted in FIG. 1 a closed magnetic flux is formed via the yoke and the assigned return path body. For this purpose, a respective section 501 includes a partial section 502 composed of three permanent magnets with magnetization directions with a component in the axial direction, a partial section 503 composed of an individual permanent magnet with a magnetization direction in the circumferential direction UR, a partial section 504 composed of three permanent magnets with magnetization directions with a component in the radial direction, and a partial direction 505 composed of an individual permanent magnet with a magnetization direction in the circumferential direction UR.

The abovementioned closed magnetic flux occurs via sections 501, which are constructed in such a way. For the yoke 3, the magnetic flux runs from the left-hand limb of the yoke via the gap S1 to a partial section 503 of the array 5', and from there to a partial section 502 of the array 5' where it is deflected to the gap S2 between the array 5' and the return path body 7. The magnetic flux crosses the gap and flows through the return path body 7 to the partial segment 502 of the array 5, where it is deflected to the partial segment 503 and from there to the partial segment 504. The magnetic flux is directed to the gap S1 under the right-hand limb of the yoke 3 by the partial segment 504, with the result that the magnetic flux closes again. Corresponding magnetic fluxes also occur for the other yokes.

A closed magnetic flux is provided for the operation of the transverse flux machine. At the same time, the return path bodies are spaced apart from the yokes. In particular, the magnetic flux is deflected via first gaps between the yoke and the permanent magnet arrays and second gaps between the return path bodies and permanent magnet arrays, wherein both gaps lie in different planes. As a result of the corresponding configuration of the permanent magnet arrays, the magnetic flux is rotated in such a way that it may close between the two arrays via the return path bodies.

FIG. 2 depicts a schematic illustration of an overall design of a three-phase transverse flux machine with the respective phases illustrated in FIG. 1. The illustration is not true to scale here. In particular, the return path bodies 7 and 7' illustrated in FIG. 2 are offset with respect to the assigned yokes 3 and 3' in the circumferential direction UR in a way analogous to FIG. 1, which is not apparent from FIG. 2. As may be seen in FIG. 2, the rotor 2 is configured in a triangular shape, wherein a corresponding phase of the transverse flux machine is formed at each side of the triangle. That is to say, the respective permanent magnet arrays 5 and 5' are formed in the rotor on each side of the triangle, wherein the corresponding stator is arranged adjacent thereto. The two yokes 3, 3', the return path bodies 7, 7' and the ring line 4 of the stator are shown in turn. The return path bodies are guided in corresponding recesses of the triangular rotor, but this is not apparent from FIG. 2. In contrast to FIG. 1, semicircular conductors are used as ring lines instead of circular conductors.

Instead of the arrangement of the phases in a triangle as depicted in FIG. 2, other configurations are also possible. In particular, the rotor may be configured as a square, wherein corresponding phases are provided on three sides of the square. Likewise, the rotor may have a hexagonal cross section and in the process form 2×3 phases at the corresponding edges of the hexagon. In addition, the illustrated ring lines may also be configured as hollow conductors with a heating pipe or a cooling fluid (e.g., water or oil) in the interior thereof.

The embodiments of the disclosure which are described above have a series of advantages. In particular, a spaced-apart arrangement of return path bodies with respect to corresponding yokes is obtained and as a result magnetic saturation is effectively combated. In this context, the magnetic flux is closed in the permanent magnet arrays by a suitable rotation of the magnetization directions. A further advantage of the transverse flux machine is that the limbs of the yokes may be made smaller, because no return path bodies are provided on the upper sides of the permanent magnet arrays. Accordingly, the ring conductor may be moved forward as far as the air gap. This additionally reduces the scattering because only a small amount of stray flux is formed between the limbs of a U-shaped yoke.

Although the disclosure has been illustrated and described in detail by the exemplary embodiments, the disclosure is not restricted by the disclosed examples and the person skilled in the art may derive other variations from this without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A polyphase transverse flux machine having a stator and a rotor configured to rotate relative to the stator about an axis in a circumferential direction, wherein the polyphase transverse flux machine comprises for a respective current phase:
   an electrical line running along a multiplicity of yokes in the circumferential direction, wherein the electrical line and the multiplicity of yokes are provided in the stator;
   a pair of permanent magnet arrays provided in the rotor, wherein the pair of permanent magnet arrays run in parallel in the circumferential direction, and wherein each magnet array of the pair of permanent magnet arrays comprises a multiplicity of permanent magnets; and
   a multiplicity of return path bodies provided in the stator, wherein each yoke is assigned a return path body spaced apart from the associated yoke in a radial direction,
   wherein a magnetization direction of the permanent magnets in the pair of permanent magnet arrays changes in such a way that a closed magnetic flux repeatedly occurs at each yoke during rotation of the rotor,
   wherein the closed magnetic flux runs from a first permanent magnet array of the pair of permanent magnet arrays via a respective yoke to a second permanent magnet array of the pair of permanent magnet arrays, and then from the second permanent magnet array back to the first permanent magnet array via the assigned return path body.

2. The polyphase transverse flux machine of claim 1, wherein a first gap is provided between each permanent magnet array and each yoke,
   wherein a second gap is provided between each return path body and each permanent magnet array,
   wherein the second gap lies in a different plane than the first gap, and
   wherein the closed magnetic flux escapes at the first gap and the second gap.

3. The polyphase transverse flux machine of claim 1, wherein the respective return path bodies are arranged between the permanent magnet arrays of the pair of permanent magnet arrays.

4. The polyphase transverse flux machine of claim 1, wherein the respective return path bodies are arranged on inner sides of the permanent magnet arrays,
   wherein the inner sides face the axis of the polyphase transverse flux machine, and
   wherein the yokes are positioned on opposite outer sides of the permanent magnet arrays.

5. The polyphase transverse flux machine of claim 1, wherein a respective return path body is offset with respect to the associated yoke in the circumferential direction.

6. The polyphase transverse flux machine of claim 1, wherein the permanent magnets of the respective permanent magnet arrays are arranged directly adjacent to one another in the circumferential direction.

7. The polyphase transverse flux machine of claim 2, wherein the respective permanent magnet arrays are divided into repeating sections along the circumferential direction,
   wherein the magnetization direction of the permanent magnets in the respective permanent magnet arrays changes in such a way that the direction of the closed magnetic flux reverses from one section to the next, and
   wherein the closed magnetic flux in each section rotates from a direction perpendicular with respect to the first gap to a direction perpendicular with respect to the second gap or from a direction perpendicular with respect to the second gap to a direction perpendicular with respect to the first gap.

8. The polyphase transverse flux machine of claim 1, wherein the polyphase transverse flux machine is configured in a three-phase fashion.

9. The polyphase transverse flux machine of claim 1, wherein the rotor has a cross section of a triangle,
   wherein the pair of permanent magnet arrays is provided on each triangular side for a current phase, and
   wherein the return path bodies are guided in recesses on each triangular side.

10. The polyphase transverse flux machine of claim 1, wherein the yokes are U-shaped, and
    wherein a respective electrical line is arranged between limbs of the U-shaped yokes of a corresponding phase.

11. The polyphase transverse flux machine of claim 1, wherein a respective electrical line has a circular outer diameter.

12. The polyphase transverse flux machine of claim 1, wherein a respective electrical line is embodied as a hollow conductor in an interior of which a cooling fluid is guided or a heating pipe is provided.

13. The polyphase transverse flux machine of claim 2, wherein the respective return path bodies are arranged between the permanent magnet arrays of the pair of permanent magnet arrays.

14. The polyphase transverse flux machine of claim 13, wherein the respective return path bodies are arranged on inner sides of the permanent magnet arrays,
    wherein the inner sides face the axis of the polyphase transverse flux machine, and
    wherein the yokes are positioned on opposite outer sides of the permanent magnet arrays.

15. The polyphase transverse flux machine of claim 14, wherein a respective return path body is offset with respect to the associated yoke in the circumferential direction.

16. The polyphase transverse flux machine of claim 15, wherein the respective permanent magnet arrays are divided into repeating sections along the circumferential direction,
    wherein the magnetization direction of the permanent magnets in the respective permanent magnet arrays changes in such a way that the direction of the closed magnetic flux reverses from one section to the next, and
    wherein the closed magnetic flux in each section rotates from a direction perpendicular with respect to the first gap to a direction perpendicular with respect to the second gap or from a direction perpendicular with respect to the second gap to a direction perpendicular with respect to the first gap.

17. The polyphase transverse flux machine of claim 2, wherein the respective return path bodies are arranged on inner sides of the permanent magnet arrays,
    wherein the inner sides face the axis of the polyphase transverse flux machine, and
    wherein the yokes are positioned on opposite outer sides of the permanent magnet arrays.

18. The polyphase transverse flux machine of claim 17, wherein a respective return path body is offset with respect to the associated yoke in the circumferential direction.

19. The polyphase transverse flux machine of claim 18, wherein the respective permanent magnet arrays are divided into repeating sections along the circumferential direction,
    wherein the magnetization direction of the permanent magnets in the respective permanent magnet arrays changes in such a way that the direction of the closed magnetic flux reverses from one section to the next, and
    wherein the closed magnetic flux in each section rotates from a direction perpendicular with respect to the first gap to a direction perpendicular with respect to the second gap or from a direction perpendicular with respect to the second gap to a direction perpendicular with respect to the first gap.

* * * * *